UNITED STATES PATENT OFFICE.

WILLIAM V. KAY, OF LAKE FOREST, ILLINOIS.

IMPROVEMENT IN PACKING FOR JOURNAL-BOXES.

Specification forming part of Letters Patent No. 209,572, dated November 5, 1878; application filed October 1, 1878.

*To all whom it may concern:*

Be it known that I, WILLIAM V. KAY, of the town of Lake Forest, in the county of Lake and State of Illinois, have invented or discovered a new and Improved Packing for Journal-Boxes, Axle-Boxes, and the like; and I hereby declare the following to be a full, clear, and exact description thereof.

The material hitherto employed for packing railway-car and other journal-boxes has, as is well known, been cotton-waste.

My invention consists in employing for this purpose the substance known as "cotton-seed hulls," being the hulls of the cotton-seed together with the considerable quantity of cotton fiber which still adheres to them after having passed through the process of separation from the seed.

My packing is applied in the usual manner in conjunction with a suitable lubricating substance or compound.

Aside from its cheapness as a product, my packing possesses great advantages over cotton alone, for, first, the hulls, being composed largely of potash, are chemically acted upon by the grease, producing a saponaceous substance which materially aids the lubrication; and, secondly, it does not, like cotton alone, condense into a close and compact mass, and thus become inoperative, for the hulls, being hard and granular and intimately mixed with the cotton clinging to them, serve to keep the latter loose and separate for an indefinite period. This latter property obviates the necessity of frequent renewal, thus affording, in addition to the other advantages named, a considerable saving in time and labor.

What I claim as new, and desire to secure by Letters Patent, is—

As a packing for journal-boxes, axle-boxes, and the like, the substance known as "cotton-seed hulls," the same being the combination of the hulls of the cotton-seed and the cotton fiber which still clings to them after passing through the process of separation from the seed, substantially as described.

WILLIAM V. KAY.

In presence of—
    P. C. DYRENFORTH,
    J. L. LEE.